Feb. 11, 1958 B. F. GREGORY 2,822,880
FRONT WHEEL HUB FOR FRONT WHEEL DRIVE AND UNIVERSAL JOINT THEREFOR
Filed April 29, 1955 4 Sheets-Sheet 1

INVENTOR.
Benjamin F. Gregory.
BY
Fishburn & Mullendore
ATTORNEYS.

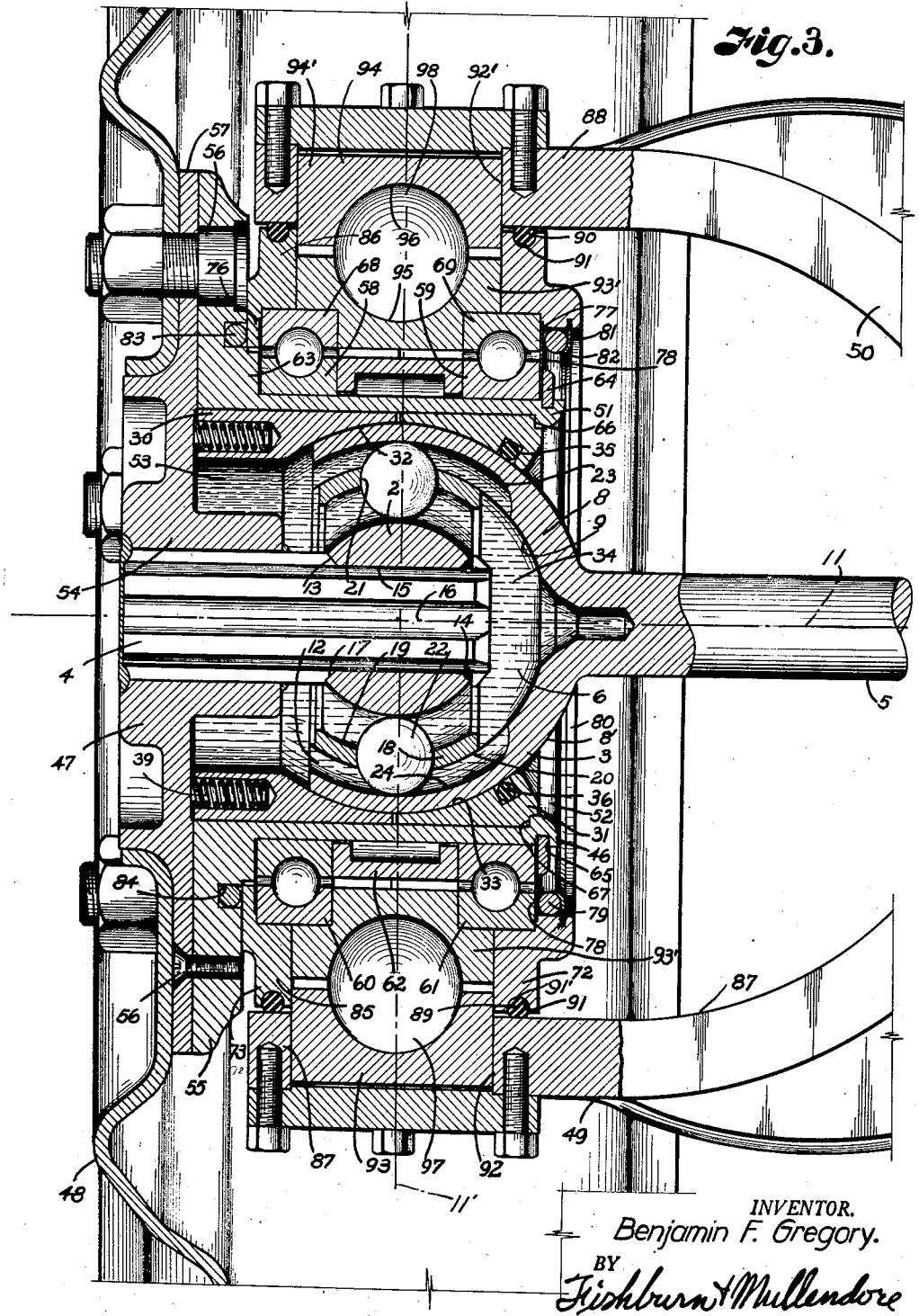

Feb. 11, 1958 B. F. GREGORY 2,822,880
FRONT WHEEL HUB FOR FRONT WHEEL DRIVE AND UNIVERSAL JOINT THEREFOR
Filed April 29, 1955 4 Sheets-Sheet 3
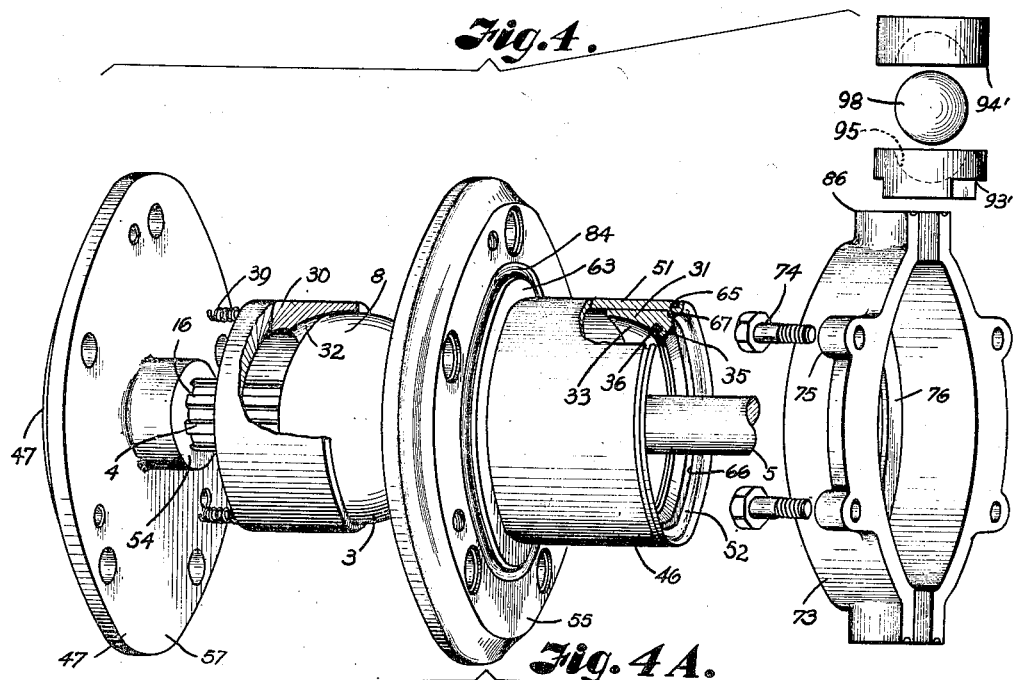
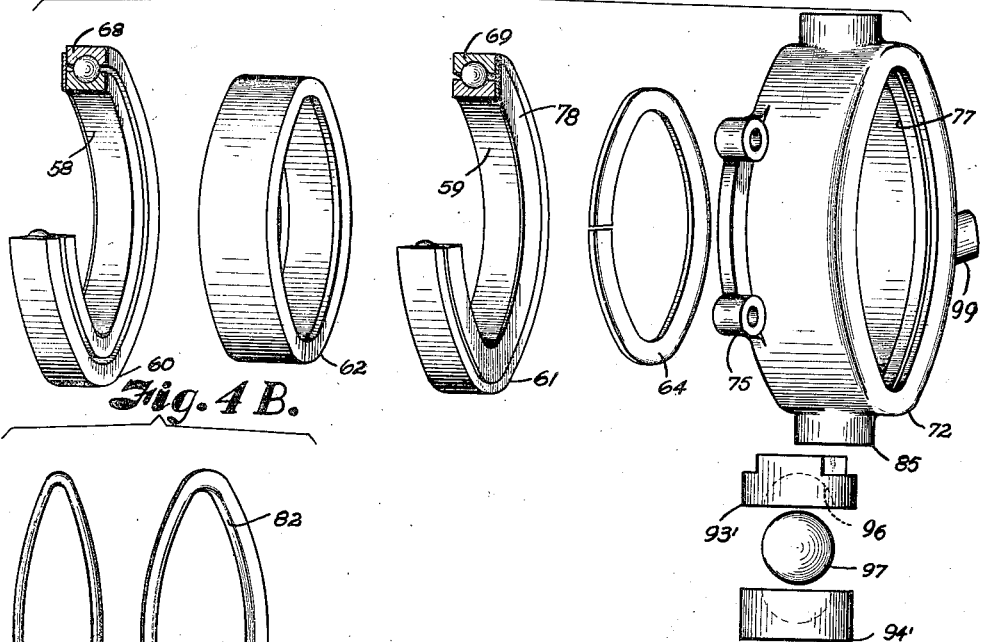
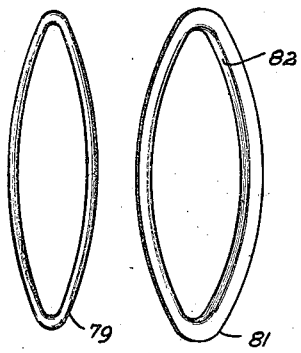
INVENTOR.
Benjamin F. Gregory.
BY
Fishburn & Mullendore
ATTORNEYS.

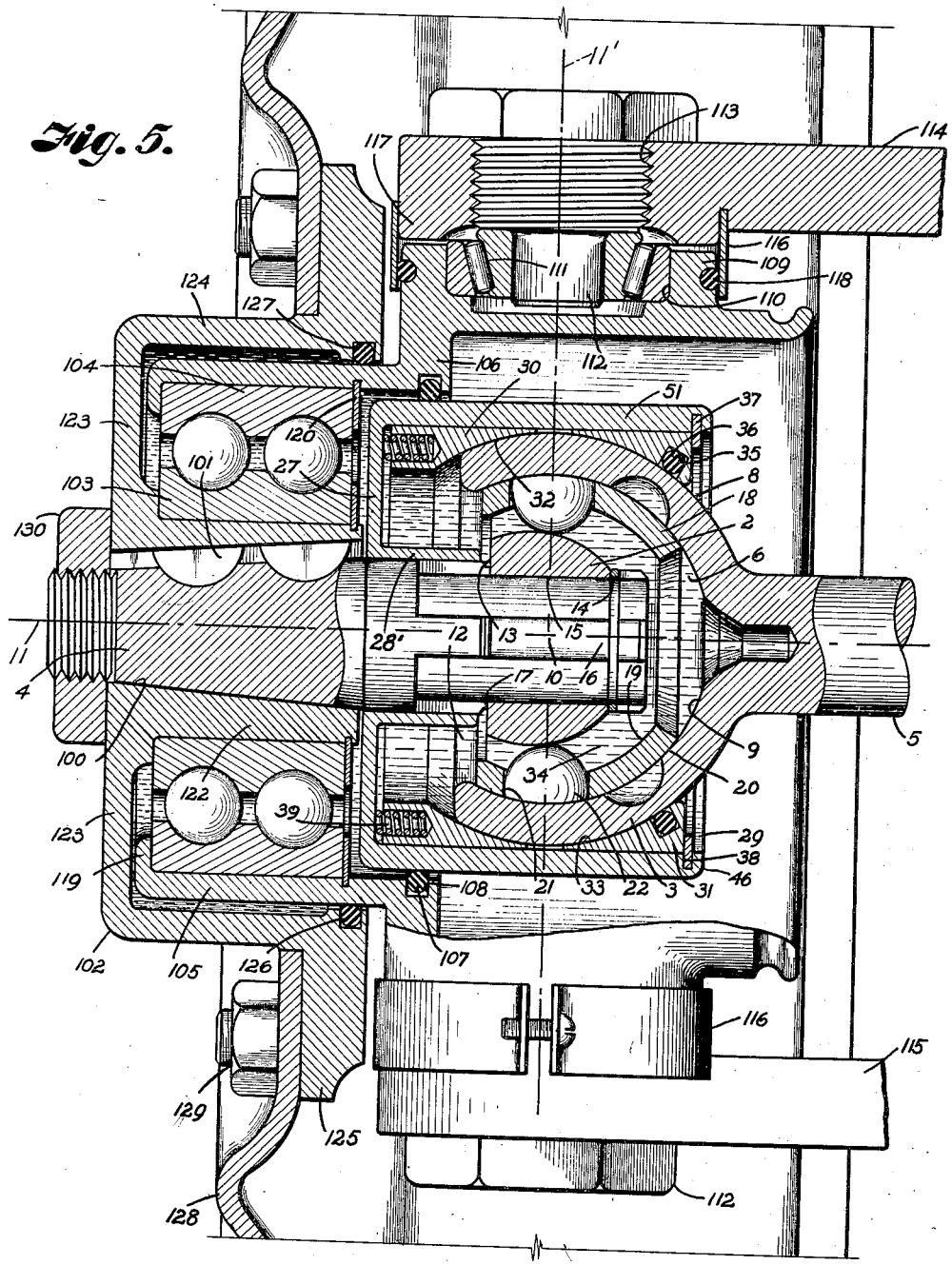

United States Patent Office 2,822,880
Patented Feb. 11, 1958

2,822,880

FRONT WHEEL HUB FOR FRONT WHEEL DRIVE AND UNIVERSAL JOINT THEREFOR

Benjamin F. Gregory, Kansas City, Mo.

Application April 29, 1955, Serial No. 504,754

4 Claims. (Cl. 180—48)

This invention relates to a front wheel mounting and particularly to a front wheel hub for a front wheel drive and a universal joint therefor of the constant velocity and whereby power from a prime mover is transmitted to the front wheels of a motor vehicle.

Universal joints of this character include ball and socket driving and driven members that are interconnected in driving and driven relation by balls operating in grooves formed in the facing sides of the respective members. Such universal joints have many advantages in that they do not cause speed fluctuations in the driving member. Also they have higher capacity for a given size, are more compact and operate with less friction. However, such universal joints are difficult to keep lubricated because the balls when rolling in the grooves of the joint members displace the lubricant therefrom and into the flexible housing element that allows for angular movement of the joint members, with the result that the ball grooves are soon depleted of lubricant.

It is, therefore, a principal object of the present invention to utilize the displacement effect of the balls during relative angular movement of the joint members for forcing the lubricant alternately from one side of the joint to the other, thereby keeping the movable parts of the joint constantly supplied with lubricant.

Further objects of the invention are to provide a forewheel drive incorporating a constant velocity universal joint equipped with the features of the present invention, to provide a fore-wheel mounting and universal connection that permits free and easy steering of the wheels and to provide a simple, compact construction wherein the pivotal action of the joint is always in the turning axis of the wheels.

Further objects of the invention are to provide a simple, light-weight structure utilizing relatively small diameter wheel bearings and to provide a structure which results in a short turning radius of the vehicle in which the unit is used.

In accomplishing these and other objects of the invention, I have provided improved structure, the preferred forms of which are illustrated in the accompanying drawings herein.

Fig. 3 is a vertical section through the central portion of a fore-wheel drive having a construction utilizing a constant velocity universal joint in accordance with the present invention.

Fig. 4 is a perspective view of the wheel-hub, axle, universal joint, spindle, drive shaft and one section of the spindle housing shown in disassembled spaced relation.

Fig. 4A is a similar view of the wheel bearings, spacing ring, locking ring and other section of the spindle housing also shown in spaced apart relation.

Fig. 4B is a perspective view of the inner sealing ring and retainer therefor.

Fig. 5 is a section similar to Fig. 3 but showing a modification of the invention.

Figure 1:
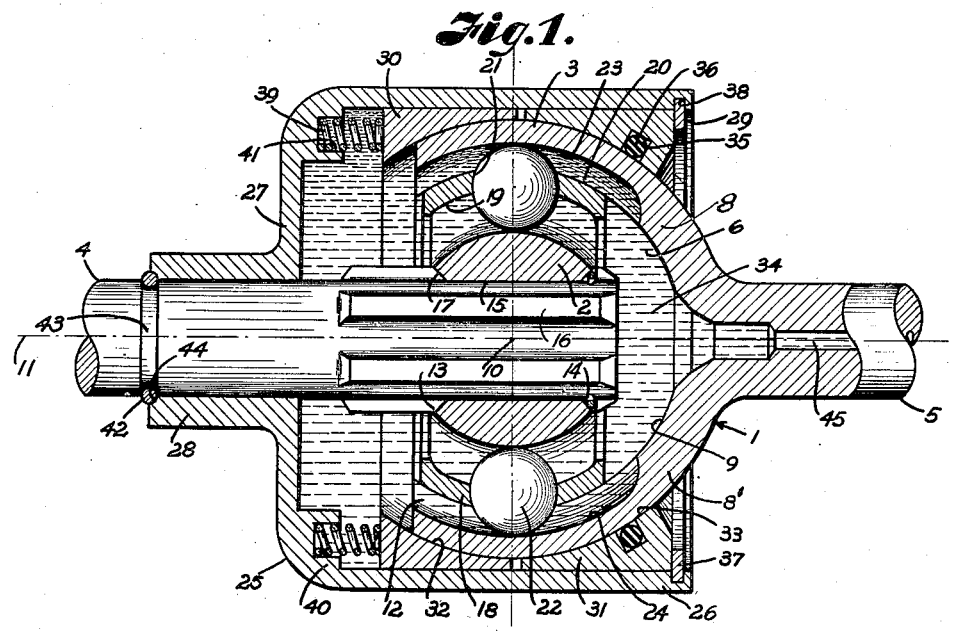
Fig. 1 is a longitudinal section through a universal joint embodying the features of the present invention and showing the driving and driven members in coaxial alignment.
Figure 2:
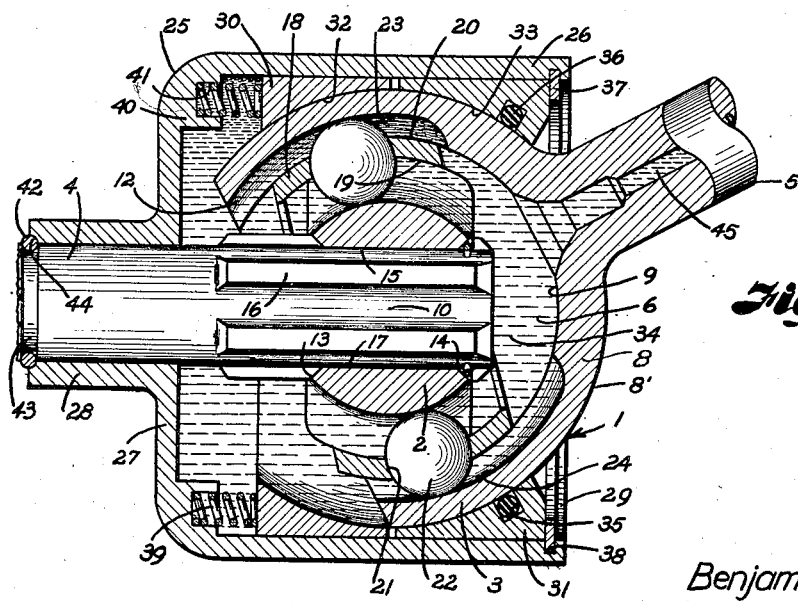
Fig. 2 shows a similar section but showing the driving member moved angularly in accordance with the action of the joint when in use.

Referring more in detail to the drawing and first to the universal joint illustrated in Figs. 1 and 2:

1 designates a constant velocity type of universal joint constructed in accordance with the present invention and including driven and driving joint members 2 and 3, respectively mounted on shafts 4 and 5 that are interconnected thereby for transmitting the power of a prime mover to a driven mechanism.

The driving member 3 is of ball shape and has a spherical cavity 6 containing the driven member 2, although either one may be the driving member or driven member. In the illustrated instance, the member 3 of the joint has a generally spherical wall 8 providing a spherical exterior surface 8' and a spherical interior surface 9 for the cavity 6 with the center of curvature indicated at 10 being located in the extended axis of the shaft 5, as indicated by the dot and dash lines 11 (Fig. 1). The end of the wall opposite the shaft 5 has an opening 12 to admit the driven member 2 therethrough and into the inner spherical cavity 6. The member 2 is preferably in the form of the belt of a sphere, in that it has flat end-faces 13 and 14. An opening or bore 15 is formed in the member 2 of the joint for accommodating the end of the shaft 4. The member 2 is fixed on the shaft 4 by means of splines 16 engaging in corresponding grooves 17 that are formed within the bore 15. The radius of the spherical face of the driven member 2 is less than the radius of the interior face of the cavity 6, to accommodate a retainer 18 therebetween and which is also in the general form of a belt of a sphere and has inner and outer spherical faces 19 and 20, respectively, which may loosely contact the inner and outer faces of the members 2 and 3 respectively as shown in Fig. 3. The retainer is provided about the circumference thereof with openings 21 each containing a ball 22 that is adapted to roll within registering grooves 23 and 24 in the members 2 and 3 as shown in Fig. 2.

The grooves 24 in the member 3 extend inwardly from the opening 12 in accordance with the spherical outer and inner surfaces 8 and 9 to form a passageway for the balls 22 when the shafts 4 and 5 change their relative angular relationship upon rotation thereof as when transmitting the power of a prime mover to a driven mechanism. The grooves 23 and 24 extend longitudinally relatively to the axis of the shafts 4 and 5 respectively and when the balls are in place provide a driving connection between the members 2 and 2. With the exception of the spherical exterior of the driving member 3 the structure thus far described is substantially conventional.

The present invention contemplates an enclosure for retaining a lubricant in contact with the balls 22 and the grooves 23 and 24 in which the balls operate as now to be described.

The joint is encased in a housing 25 having an annular wall 26 encircling the driving member 3 of the joint, a closed end 27 which has a bearing 28 on the shaft 4 and an open opposite end 29 to accommodate movement of the shaft 5 therein.

The housing 25 also includes means to form a seal about the spherical surface 8' of the socket member 3. In the illustrated form of the invention, this is effected by sealing rings 30 and 31 that are inset within the housing and have partially spherical faces 32 and 33 in contact with the spherical face 8 of the socket member. The sealing ring 31 cooperates with the driving member 3 in closing the open end 29 of the housing for containing a lubricant 34 therein. To facilitate sealing action of the ring 31, the inner circumference thereof has a circumferential groove 35 containing an O ring 36 therein and which forms a resilient seal between the driving member and the sealing ring 31. The sealing ring 31 is retained within the housing 25 to cooperate with the sealing ring 30 in retaining the housing centered with respect to the center joint 10 of the universal joint. This is effected by backing the sealing ring 31 with a split-locking ring 37 which is inset in a groove 38 encircling the open end of the housing and by pressing the sealing ring 30 against the exterior surface of the socket member by springs 39. The springs 39 have one end seated within sockets 40 of lugs 41 located at the juncture of the end wall 27 with the annular wall 26. The housing 25 is fixed from longitudinal movement on the shaft 4 by means of a snap ring 42 engaged in an angular groove 43 of the shaft 4 and in a groove 44 encircling the shaft at the outer end of the bearing 28.

In assembling the joint, the springs 39 are seated in the sockets 40 and the sealing ring 30 is pushed into the housing to be engaged by the ends of the springs. The housing 25 is sleeved over the outer end of the shaft 4 until the bearing 28 passes the groove 43. The snap ring 42 is inserted in the groove 43 and the housing is shifted to bring the bearing in contact with the ring 42. The joint members may have been previously applied to the shaft 4 or they may now be applied through the open end of the housing and seated within the sealing ring 30. The outer sealing ring 31 carrying the O ring 36 together with the lock ring 37 is slid over the outer end of the shaft 5 and into seating contact with the exterior spherical surface of the member 3, after which the lock ring 37 is engaged in the grooves 38 to back the sealing ring 31 and retain the parts in assembly. The lubricant 34 may be inserted in the housing through an axial passageway 45 in the shaft 5. A sufficient quantity of lubricant is inserted to fill the space within the housing including the grooves 23 and 24 and the space within the spherical cavity of the socket member.

When the joint is used in an installation where the shaft 4 rotates on a fixed axis and the shaft 5 moves at an angle relative to the shaft 4 as the shaft 5 is rotated, the balls 22 travel back and forth within the grooves 23 and 24 as shown in Fig. 2, with the retainer 18 oscillating about the center point 10. It is obvious that as the balls at one side of the joint push the lubricant from the grooves at that side, pressure is applied to the confined lubricant for forcing the lubricant into the corresponding ends of the grooves at the opposite side of the joint likewise the lubricant that is expelled from the opposite ends at that side of the joint is forced into the ends of the grooves at the opposite side of the joint thereby maintaining the grooves full of lubricant for adequate lubrication of the balls and their grooves throughout the entire movement of the joint.

It is obvious that since the seal is effected without the use of resilient boots or the like, as in conventional practice, any pressure applied to the lubricant is transmitted throughout the entire body of the lubricant because the lubricant is confined from all sides by rigid walls of the housing and by seal which is maintained between the housing and the socket member.

Figs. 3 and 5 show the universal joint incorporated in a fore-wheel mounting for a motor vehicle. In Fig. 3, the universal joint, with exception of the housing 46, follows the structure previously described and like numerals are used to designate the parts of the joint. The housing 46 for the joint forms a spindle to which a hub 47 for a wheel 48 is attached and whereon the wheel rotates and is turned within the yoke 49 of an axle 50 member of the motor vehicle. The housing 46 includes an annular wall 51 having open ends 52 and 53 for accommodating the drive shaft 5 and the collar 54 in which the shaft 4 is fixed by means of the splines 16 which also fix the ball member 2 of the universal joint. The annular wall 51 of the spindle also has a laterally extending annular flange 55 which carries the fastening devices 56 by which the wheel 48 and the hub 47 are attached, the hub 47 having a flange 57 which is engagable between the wheel 48 and the flange 55 as shown in Fig. 3. Mounted circumferentially on the annular wall 51 of the spindle are the inner races 58 and 59 of anti-friction bearings 60 and 61, the inner races being spaced apart by a ring 62 that retains the race 58 in contact with an annular shoulder portion 63 on the flange of the spindle and the race 59 in contact with a locking ring 64 that is engaged in an annular groove 65 formed in the outer face of the annular wall. The annular wall 51 also has an inner annular shoulder 66 for seating an inset shoulder 67 on the sealing ring 31 of the universal joint. The sealing ring 30 of the universal joint is retained in contact with the exterior spherical face of the socket member of the joint by the springs 39 which in this case bear against the flange 57 of the hub and provide resilient means rotatable therewith to urge the sealing or bearing ring 30 toward the ring 31 to retain the center of the universal joint in coincidence with the crossing point of the axes 10 and 11. The outer races 68 and 69 of the anti-friction bearings 60 and 61 that are formed in housing sections 72 and 73, which encircle the bearings and are secured together by clamping devices such as bolts 74 that are extended through ears 75 projecting from the housing sections as shown in Fig. 4. The housing sections have inwardly extending annular flanges 76 and 77 at outer sides thereof for engaging the outer sides of the outer races of the bearings shown in Fig. 3. The open side of the inner bearing is closed by a relatively thin sealing ring 78 which is anchored between the locking ring 64 and the outer side face of the inner bearing race so as to rotate with the spindle and in sealing contact with an O ring 79 that is carried within the open side 80 of the housing by a retainer 81 and its inner marginal portion curves around the O ring 79 as indicated in 82. A seal is effected at the opposite side of the bearing by means of an O ring 83 supported within an annular groove 84 in the inner face of the flange 55 and having sealing contact with the outer face of the housing section 73. Extending from the periphery of the housing sections 72 and 73 in plane with the center point 10 of the universal joint are semi-circular bosses 85 and 86 to form trunnions positioned between arms 87 and 88 of the yoke 49 of the axle member 50, a seal being effected between the arms of the yoke and trunnions by O rings 89 and 90 that are inset within grooves 91 and 91' that are provided within the circular bosses and which have contact with the arms of the yoke.

Inset within registering openings 92 and 92' of the arms 87 and 88, and the openings encircled by the circular bosses 85 and 86 are trunnions or king-pin assemblies 93 and 94, each including disks 93' and 94' closely engaged therein and each being provided with a semi-spherical recess 95 and 96 to contain balls 97 and 98 to key the plate members together and form pivots on which the housing is adapted to swing on an axis 11' transversely to the axis 12 of the axle member when steering the vehicle through a steering mechanism, not shown but which is adapted to be connected with an arm 99 on the housing section 72 as will be well understood to those skilled in the automotive art.

It is obvious that the cylindrical portion of the housing 46 which forms the spindle and the radial part of the collar 54 provide parts which cooperate with the spherical surface and socket member of the universal joint to form a chamber adapted to contain a lubricant when the bearing or sealing rings 30 and 31 are in place. It is also apparent that the bearing or sealing rings retain the center of the universal joint at the crossing point of the wheel turning and rotating axes.

Even though the universal joint is of relatively small diameter, relatively smaller wheel bearings can be used in the form of the invention illustrated in Fig. 5. In this form of the invention the universal joint parts including the housing 46 therefor are substantially the same as the corresponding parts of the universal joint illustrated in Figs. 1 and 2. However, to accommodate the joint in a fore-wheel drive, the bearing collar of the housing 46 is turned inwardly as indicated at 28', Fig. 5 and the driven shaft 4 which projects outwardly therefrom is in the form of a taper 100 and provided with keys 101 by which the hub 102 of the wheel is connected in driven relation with the universal joint. In this form of the invention the bearing races 103 and 104 are carried within an encircling wall 105 projecting laterally from flange portion 106. The wall 105 has an inner diameter slightly greater than the outer diameter of the universal joint housing 46 whereby the wall 105 encircles the joint housing 46 and forms a seal therewith by an O ring 107, the O ring being supported in an annular groove 108 formed in the inner circumference of the flange portion 106 and having sealing contact with the periphery of the joint housing. Projecting from upper and lower diametrical portions of the annular wall 105 and formed as a part of the flange portion 106 are circular bosses 109 having bearing recesses 110 for accommodating anti-friction bearings 111. The bearings 111 have have their axis 11' extending substantially through the pivot point 10 of the universal joint and journal trunnions 112 which are screwed into threaded openings 113 of the arms 114 of the axle member 115. A seal is effected about the joint between the arms 114 and the bosses 109 by bands 116 that are clamped about bosses 117 on the arms which lap over the bosses 109 to engage sealing rings 118 that are carried thereby.

The wall portion 105 terminates in an inwardly extending flange 119 which cooperates with a locking ring 120 inset at the opposite side of the bearing 103 to retain the outer race thereof. The hub 102 of the wheel includes a collar 122 to connect with an end wall 123 and an annular wall 124 which carries a wheel attaching flange 125. A seal is effected between the walls 124 and 105 by an O ring 126 supported in an internal groove 127 in one of the walls for a sealing contact with the other wall. The wheel 128 is attached by fastening devices 129. The hub is secured to the tapered end 100 of the driven shaft by a nut 130 that is threaded onto a threaded end 100.

When a castor effect is desired the axis of the bearings 111 is offset slightly forwardly of the axis of wheel rotation which places the swinging axis of the wheel forwardly of the center of the universal joint 10. This arrangement facilitates steering of the wheel and does not interfere with action of the drive.

From the foregoing, it is obvious that I have provided a constant velocity universal joint, wherein the joint is provided with a housing which allows for free action of the shafts and confines a lubricant in constant contact with all moving parts of the joint, this being effected by action of the joint because the lubricant displaced at one side thereof fills the spaces from which lubricant is being displaced at opposite side of the joint. It is also obvious that I have provided an improved forewheel drive and wheel mounting in which a constant velocity universal joint is incorporated to produce a simple, light-weight and compact structure that permits free and easy steering of the wheels since the pivotal action of the joint is at all times in the turning action of the wheels.

What I claim and desire to secure by Letters Patent is:

1. A wheel mounting for a forewheel of a motor vehicle including a supporting having spaced apart upper and lower arms, a generally circular housing diametrically disposed between said arms, means pivotally connecting upper and lower diametrical sides of said housing with the arms to provide a turning axis for said wheel, a hub having a cylindrical spindle portion, antifriction bearings in said housing on the respective sides of said turning axis for journaling the cylindrical spindle portion to carry the wheel for rotation on an axis transversely of said turning axis, a stub shaft having a driving connection with said hub, a driving shaft, a universal joint in said cylindrical spindle portion and connecting the driving shaft with the stub shaft and having a spherical surface extending concentrically from one of said shafts on a radius from the intersecting point of said turning and transverse axes, bearing rings supported within said cylindrical spindle in encircling contact with said spherical surface on opposite sides of said turning axis to cooperate with said cylindrical spindle and said spherical surface of the universal joint to form a closed chamber adapted to contain a lubricant for said joint, means for anchoring one bearing ring within said cylidrical spindle at one side of the turning axis and means for resiliently urging the bearing ring at the opposite side of the turning axis toward the anchored ring to retain said center of the universal joint in coincidence with the crossing point of said axes.

2. A wheel mounting for a forewheel of a motor vehicle including a support having spaced apart upper and lower arms, a generally circular housing diametrically disposed between said arms, means pivotally connecting upper and lower diametrical sides of said housing with the arms to provide a turning axis for said wheel, a hub having a cylindrical spindle portion, antifriction bearings in said housing on the respective sides of said turning axis for journaling the cylindrical spindle portion to carry the wheel for rotation on an axis transversely of said turning axis, a stub shaft having a driving connection with said hub, a driving shaft, a universal joint in said cylindrical spindle portion and connecting the driving shaft with the stub shaft and having a spherical surface extending from the driving shaft on a radius from the intersecting point of said turning and transverse axes, bearing rings supported within said cylindrical spindle in encircling contact with said spherical surface on opposite sides of said turning axis to cooperate with said cylindrical spindle and said spherical surface of the universal joint to form a closed chamber adapted to contain a lubricant for said joint, means for anchoring one bearing ring at the side of the universal joint to which the driving shaft is connected, means for resiliently urging the other bearing ring at the opposite side toward the fixed ring to retain said center of the universal joint in coincidence with the crossing point of said axes, and a sealing ring carried by the anchored bearing ring and having sealing contact with the spherical surface of the universal joint to prevent leakage of lubricant from said chamber.

3. A wheel mounting for a fore wheel of a motor vehicle including a support having spaced apart upper and lower arms, a generally circular housing diametrically disposed between said arms, means pivotally connecting upper and lower diametrical sides of said housing with the arms to provide a steering axis for said wheel, a hub for the wheel, anti-friction bearings journaling the hub in said housing to carry the wheel for rotation on an axis transversely of said steering axis of said housing, a stub shaft having a driving connection with said hub, a driving shaft, a universal joint connecting the driving shaft with the stub shaft and having a spherical surface extending from one of said shafts on a radius from the intersecting point of said transverse axis with the steering axis, bearing rings in encircling contact with said spherical surface on opposite sides of said steering axis, means rotatable with the hub for anchoring one bearing ring on one side of the steering axis, resilient means rotatable with the hub urging the bearing ring at the opposite side of the steering axis toward the anchored ring to retain said center of the universal joint in coincidence with the crossing point of said axes, a lubricant chamber being provided within said joint, a lubricant sealing means between said means which is rotatable with the hub and said generally circular housing to seal one side of the anti-friction bearings, a sealing means between the hub and said generally circular housing to seal the opposite side of the anti-friction bearings, and a sealing means between said anchored bearing member and the spherical surface of said joint.

4. A wheel mounting as described in claim 3 wherein said means which is rotatable with the hub for anchoring one bearing ring comprises a separate housing containing said bearing rings and enclosing the universal joint.

References Cited in the file of this patent

UNITED STATES PATENTS

| | | |
|---|---|---|
| 1,881,201 | Livingood | Oct. 4, 1932 |
| 2,065,999 | Faure | Dec. 29, 1936 |
| 2,074,703 | Nelson | Mar. 23, 1937 |
| 2,212,193 | Keese | Aug. 20, 1940 |
| 2,350,482 | Venditty | June 6, 1944 |
| 2,403,477 | Gregory | Apr. 11, 1950 |
| 2,623,604 | Keese | Dec. 30, 1952 |
| 2,685,184 | De Nador et al. | Aug. 3, 1954 |
| 2,698,104 | Dudley | Dec. 28, 1954 |